United States Patent [19]

Bowman

[11] Patent Number: 4,648,789

[45] Date of Patent: Mar. 10, 1987

[54] SEALING MEANS FOR A CYLINDRICAL PUMP CASE OR THE LIKE

[75] Inventor: Dennis G. Bowman, Whittier, Calif.

[73] Assignee: Dresser Industries, Inc., Dallas, Tex.

[21] Appl. No.: 732,752

[22] Filed: May 10, 1985

Related U.S. Application Data

[63] Continuation-in-part of Ser. No. 503,450, Jun. 13, 1983, which is a continuation-in-part of Ser. No. 179,399, Aug. 19, 1980, abandoned.

[51] Int. Cl.$^4$ ............................................. F04D 29/08
[52] U.S. Cl. ................................... 415/110; 415/201; 415/219 C; 277/3; 277/182
[58] Field of Search ............ 415/110, 111, 113, 219 C, 415/201, 126, 127, 128; 277/3, 27, 28, 29, 181, 182, 189

[56] References Cited

U.S. PATENT DOCUMENTS

| | | | |
|---|---|---|---|
| 2,021,346 | 11/1935 | Allen | 415/110 |
| 2,822,196 | 2/1958 | Canfield | 277/27 |
| 3,179,422 | 4/1965 | Phillips | 277/3 |
| 3,329,171 | 7/1967 | Sibbald | 415/201 X |
| 3,443,814 | 5/1969 | Dahlheimer | 277/27 X |
| 3,604,820 | 9/1971 | Scheller | 415/201 X |
| 4,296,935 | 10/1981 | Inouye | 277/27 X |

Primary Examiner—Abraham Hershkovitz
Assistant Examiner—Joseph M. Pitko

[57] ABSTRACT

An improved seal for a generally cylindrical pump case provides an internal seal between the case and the head for preventing the flow of fluid between them. The improved seal includes a flexible annular responsive means attached or unattached to the head and carrying a resilient annular seal member. Increasing pressure within the pump case forces the flexible annular pressure responsive means into engagement against the interior surface of the case preventing extrusion of the resilient annular seal member when the case is pressurized, thus providing a more efficient fluid tight seal.

9 Claims, 7 Drawing Figures

SEALING MEANS FOR A CYLINDRICAL PUMP CASE OR THE LIKE

The present invention is a continuation-in-part of copending patent application Ser. No. 503,450 filed June 13, 1983 for An Improved Sealing Means for a Cylindrical Pump Case or the Like, which was a continuation-in-part of patent application Ser. No. 179,399 filed Aug. 19, 1980, now abandoned.

TECHNICAL FIELD OF THE INVENTION

This invention relates generally to pumps. More particularly, this invention relates to an improved internal sealing arrangement for preventing the flow of fluid between a pump case and head wherein the sealing means is responsive to pressure within the case.

BACKGROUND OF THE INVENTION

Various means have been utilized in the past in the attempt to prevent the flow of fluid between the head and case. These attempts have not been entirely satisfactory.

One apparatus which has been used is the use of O-rings in a male gland type joint, but they are extruded through gaps between the pump case and head during case pressurization.

N. H. Sachink illustrated an annular responsive lip as part of the seat of a ball check valve in his pump described in U.S. Pat. No. 3,327,635 issued June 29, 1967.

A similar pressure-responsive lip arrangement was utilizd in a packing ring presented by R. E. Henry in U.S. Pat. No. 3,685,840 issued Aug. 22, 1972.

However, the pressure-responsive lip alone is unsatisfactory in providing a fluid tight seal in a large cylindrical pump.

Macks in U.S. Pat. No. 3,093,382 described a self-balancing seal as a combination thrust bearing and seal which provides a fluid seal which is movable along the path of fluid escape. However, it is unsuitable for use in a pressurized pump case because no leak can be tolerated.

It is an object of this invention to provide an improved sealing means for cylindrical pump cases or the like that effectively prevents leakage between the head and case.

SUMMARY OF THE INVENTION

This invention provides an improved seal means for a cylindrical pump case wherein the pump includes a head. The improvement comprises annular pressure-responsive means located within the case and supported by the head. This pressure-responsive means has an annular groove in a flexible portion that is located adjacent to the case and has an annular seal member located therein in sealing engagement with the case and the flexible portion for preventing the flow of fluid between the head and case. As pressure increases within the case, the flexible portion may engage the case 10, preventing the extrusion of the annular seal member.

BRIEF DESCRIPTION OF THE DRAWING

The foregoing additional objects and advantages of the invention will become more apparent as the following detailed description is read in conjunction with the accompanying drawing wherein the like reference characters denote like parts in all views and wherein.

DETAILED DESCRIPTION OF THE PREFERRED EMBODIMENT

Figure 1:
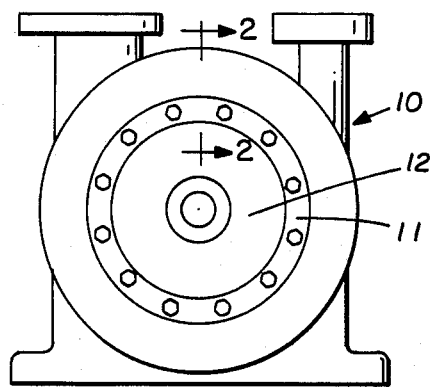
FIG. 1 is a front elevation view of a cylindrical pump in which the present invention has been incorporated.

Referring to the drawing and to FIG. 1 in particular, shown therein and generally designated by the reference character 10 is a cylindrical pump case that is constructed in accordance with the invention. The pump case 10 includes a head 12 that is disposed transversely to the central axis of the case 10 and held in place by a bolted retainer ring 11. A vent hole 13 extends through the case 10.

Figure 2:
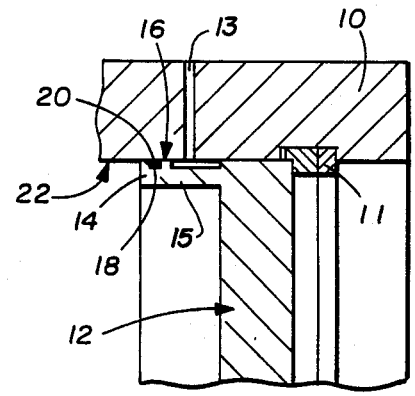
FIG. 2 is an enlarged cross-sectional view taken substantially along the line 2—2 of FIG. 1, showing the improved sealing means in more detail.

At the outer perimeter of the head 12, as shown in FIG. 2, there is an annular, pressure responsive lip 14 which includes a portion 15 that is relatively thin and is therefore substantially more flexible than the case 10 or head 12 and an outer peripheral portion 16 having an annular groove 18 therein. The groove 18 is disposed adjacent to the inner periphery 22 of the case 10. Located within the annular groove 18 is a resilient annular seal member 20 in sealing engagement with the case 10 and with the annular pressure-responsive lip 14 for preventing the flow of fluid between the head 12 and the case 10.

The vent hole 13 is positioned between the seal member 20 and the end of the case 10 so that the flexible portion 15 is exposed to atmospheric pressure on the outer perimeter or side adjacent to the case 10 and to the pump pressure within the bore on the inner perimeter or other side. Thus, the lip 14 may have a substantial pressure differential thereacross depending upon the internal pump pressure.

When the pump is in operation, an increase in the internal pressure in the case 10 displaces or bends the flexible portion 15 of the lip 14 radially outwardly toward the inner periphery 22 of the case 10. The seal member 20 moves into tighter engagement with the case 10 and the lip 14 moves closer to or into engagement with the case 10 thereby preventing the extrusion of the resilient seal member 20. The fluidtight integrity of the seal is maintained since extrusion of the member 20 is prevented.

The lip 14 in this embodiment is formed of the same material as the head 12. The seal member 20 may be of any material consistent with the materials handled in the pump. A very resilient material, such as a plastic or rubber, can be used because of the support provided by the lip 14.

DESCRIPTION OF THE EMBODIMENT OF FIG. 3

Figure 3:
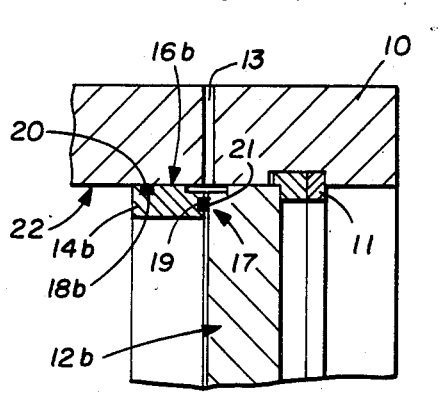
FIG. 3 is a view similar to FIG. 2, but illustrating another embodiment of the sealing arrangement that is also constructed in accordance with the invention.

The sealing arrangement illustrated in FIG. 3 is similar to that illustrated in FIG. 2. However, it should be pointed out that instead of the annular lip 14 being an integral part of the head 12b, a discrete, relatively flexible member 14b is utilized. The member 14b is, as is the lip 14, relatively thin compared to the head and case, and, thus more easily deformed.

The member 14b has an outer peripheral portion 16b having an annular groove 18b therein disposed adjacent to the inner periphery 22 of the case 10. The resilient annular seal member 20 is located in the groove 18b in sealing engagement with the case 10 and with the member 14b. The sealing engagement of the seal member 20 with the case 10 and member 14b prevents the flow of fluid between the head 12b and the member 14b.

The member 14b also has an end portion 17 having a second annular groove 19 therein disposed adjacent to the head 12b with a resilient annular seal member 21 located therein in sealing engagement with the head 12b and with the member 14b for preventing the flow of fluid between the head 12b and the member 14b. Increasing internal pressure in the pump case also urges the member 14b axially. The seal member 21 is moved into tighter engagement with the head 12b by such movement and the member 14b engages the head 12b, preventing extrusion of the resilient seal member 21.

The member 14b functions similarly to the lip 14 with respect to the internal pressure of the pump case. However, an increase in the internal pressure in the pump case 10 expands the member 14b radially outwardly toward the inner periphery 22 of the case 10. The seal member 20 carried thereby is moved into tighter engagement with the case 10. Extrusion of the resilient seal member 20 is prevented by the proximity of the member 14b to the case 10 by engagement of the member 14b with the case 10 as determined by the pressure differential across the member 14b. Similar to the embodiment of FIG. 2, increasing internal pressure in the pump case 10 urges the flexible annular pressure-responsive member 14b radially into tighter engagement with the case 10, thereby preventing extrusion of the resilient annular seal member 20.

DESCRIPTION OF THE EMBODIMENT OF FIG. 4

Figure 4:
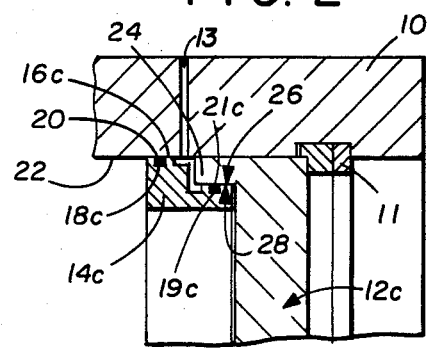
FIG. 4 is a view similar to FIG. 2, but illustrating another embodiment of the sealing arrangement that is also constructed in accordance with the invention.

The sealing arrangement illustrated in FIG. 4 is similar to that illustrated in FIG. 3 wherein the annular pressure-responsive means is a discrete member 14c. In cross-section, the member 14c has an L-shaped configuration overlying a flange 24 on a head 12c. The head 12c is a modified form of the head 12 and, as can be seen, the flange 24 extends parallel to the longitudinal axis of the pump case 10.

The member 14c has an annular groove 18c therein disposed adjacent to the case 10. The resilient annular seal member 20 is located in the groove 18c in sealing engagement with the case 10 and with the member 14c for preventing the flow of fluid between the case 10 and member 14c.

The member 14c has a second outer peripheral portion 26 of lesser diameter having an annular groove 19c therein that is located in juxtaposition with the flange 24. A resilient annular seal member 21c is disposed in the groove 19c in sealing engagement with the member 14c and with an inner flange surface 28 on the head 12c for preventing the flow of fluid between the flange 24 and member 14c.

Increasing internal pressure in the pump case 10 urges the flexible annular responsive member 14c radially toward and, if the pressure is sufficient, into engagement with the case 10 to prevent extrusion of the resilient annular sealing member 20. Similarly, increasing internal pressure urges the member 14c radially toward and, if the pressure is sufficient, into engagement with the case 10 preventing extrusion of the annular seal member 21c that is located in the groove 19c. Thus, a fluid tight seal is maintained between the member 14c, the case 10, and the head 12c.

DESCRIPTION OF THE MODIFICATION OF FIG. 5

Figure 5:
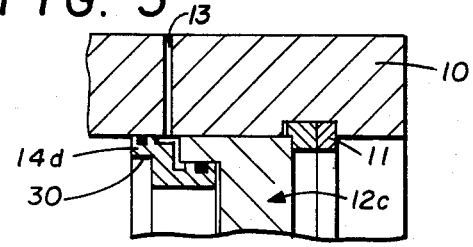
FIG. 5 is a view similar to FIG. 4, but illustrating a modification of the sealing arrangement of FIG. 4 that is also constructed in accordance with the invention.

The sealing arrangement illustrated in FIG. 5 is substantially identical to that illustrated in FIG. 4. However, the member 14c has been modified to include a stepped inner peripheral portion 30 that provides greater flexibility. The modified member is designated by the reference character 14d. Resilient annular sealing members are disposed in grooves in the member 14d. One seal is located in a groove on the outer peripheral portion engaging the head 10 and one in a groove in the outer peripheral portion in engagement with the flange of head 12c. The operation of this arrangement is the same as described with respect to the modification shown in FIG. 4.

DESCRIPTION OF THE MODIFICATION OF FIG. 6

Figure 6:
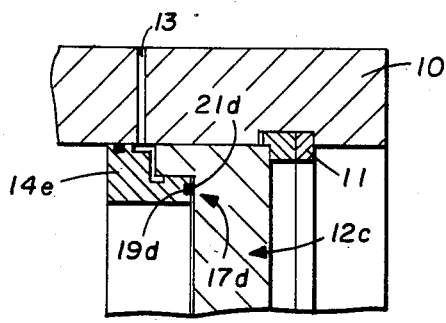
FIG. 6 is a view similar to FIG. 4, but illustrating another modification of the sealing arrangement of FIG. 4 that is also constructed in accordance with the invention.

The sealing arrangement illustrated in FIG. 6 is substantially identical to that illustrated in FIG. 4, except that a second annular groove 19d is axially disposed and positioned in the end of a resilient member 14e which is a modified form of the member 14d. A resilient annular seal member 21d is located in a groove in the outer periphery of the member 14e. A seal member 21d is located in a groove 19d in sealing engagement with the member 14e and the head 12c for preventing the flow of fluid between the member 14e and the head 12c. Operationally, this modification is essentially the same as the embodiment of FIG. 3.

DESCRIPTION OF THE MODIFICATION OF FIG. 7

Figure 7:
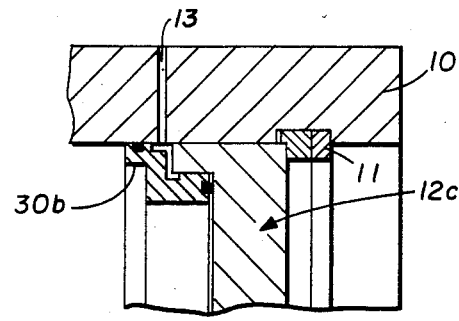
FIG. 7 is a view similar to FIG. 6, but illustrating a modification of the sealing arrangement of FIG. 6 that is also constructed in accordance with the invention.

The sealing arrangement illustrated in FIG. 7 is essentially the same as illustrated in FIG. 5 with the exception of the location of the seal member which is disposed in engagement with the head 12c and functions as does the sealing member 17 shown in FIG. 3.

The annular member of FIG. 7 includes a portion 30b of substantially greater flexibility. The portion 30b is similar to the portion 30 of FIG. 5. When in use, the modification of FIG. 7 operates in a manner identical to the device shown in FIG. 6.

As previously mentioned in connection with FIG. 3, the annular members may be constructed from virtually any material that is compatible with the fluid being pumped and that has sufficient strength to avoid extrusion. The seal members are preferably formed from a relatively soft, resilient material that is also compatible with the fluid being pumped. The material should form an initial seal when assembled in the pump and should deform to permit the annular member to engage the case or head member to avoid extrusion when required.

The embodiments described in detail hereinbefore are provided by way of example only and it will be understood that many changes and modifications can be made thereto without departing from the spirit or scope of the invention.

What is claimed is:

1. In a pump and the like including a case having a generally cylindrical bore therein extending through at least one end of said case and a head member for closing said bore, improved seal means for preventing fluid flow between said head member and case, said improvement comprising:

annular means located within said bore and supported by said head, said annular means including a seal support portion adjacent to said case that is substantially thinner and more flexible than said case adjacent to said head member, said flexible portion means having an annular groove therein adjacent to said case;

a resilient annular seal member located in said groove in fluid-tight sealing relationship with said case and with said annular means; and, said flexible portion of said annular means moving in response to pressure in said case into engagement with said case to prevent extrusion of said annular seal member out of said groove.

2. The improvement of claim 1 and also including vent means in said case for venting the space between said seal member and the end of said case to the exterior of said case.

3. The improvement of claim 1 wherein said annular means projects from said head member and said annular means and head member are of unitary construction.

4. In a pump and the like including a case having a generally cylindrical bore therein extending through at least one end of said case and a head member for closing said bore, improved seal means for preventing fluid flow between said head member and case, said improvement comprising:

a discrete annular member located within said bore and engageable with said head member, said annular member including a seal support portion adjacent to said case that is substantially thinner and more flexible than said case adjacent to said head member, said flexible portion having an annular groove therein adjacent to said case;

a resilient annular seal member located in said groove in fluid-tight sealing relationship with said case and with said annular member; and, said flexible portion of said annular member moving in response to pressure in said case into engagement with said case to prevent extrusion of said annular seal member out of said groove.

5. The improvement of claim 4 wherein said annular member includes:

a surface disposed in generally parallel relationship to a portion of said head member;

a groove in said surface; and, said improvement also includes a resilient annular seal member located in said groove in sealing engagement with said head member and with said annular member.

6. The improvement of claim 5 and also including means for venting the space between said resilient annular seal member to the exterior of said case.

7. The improvement of claim 6 wherein:

said head member has an axially extending, annular flange disposed within said bore; and, the discrete annular member is of generally L-shaped cross-section overlying said annular flange.

8. The improvement of claim 7 wherein said last mentioned seal member is located in said discrete member in sealing engagement with said annular flange.

9. The improvement of claim 7 wherein said last mentioned seal member is located in said discrete member in sealing engagement with said head member away from said annular flange.

* * * * *